United States Patent [19]

Larson et al.

[11] Patent Number: 4,949,423
[45] Date of Patent: Aug. 21, 1990

[54] DRYER FOR AUTOMATIC CAR WASH EQUIPMENT

[75] Inventors: Sherman L. Larson, Palmyra; Daniel J. Del Prato, Marlton, both of N.J.

[73] Assignee: Sherman Industries, Inc., Palmyra, N.J.

[21] Appl. No.: 280,125

[22] Filed: Dec. 5, 1988

Related U.S. Application Data

[63] Continuation-in-part of Ser. No. 59,862, Jun. 8, 1987, Pat. No. 4,809,392.

[51] Int. Cl.⁵ ................................................ B60S 3/04
[52] U.S. Cl. .................................... 15/316 R; 15/319; 15/DIG. 2; 34/229; 34/243 C
[58] Field of Search ................. 15/312 R, 316 R, 319, 15/DIG. 2; 34/243 C, 229

[56] References Cited

U.S. PATENT DOCUMENTS

| | | | |
|---|---|---|---|
| 3,323,228 | 6/1967 | Maxwell | 34/229 |
| 3,442,027 | 5/1969 | Hurwitz | 34/229 X |
| 4,383,344 | 5/1983 | Scraggs et al. | 15/53 A |
| 4,559,721 | 12/1985 | Hanna | 15/405 X |
| 4,562,848 | 1/1986 | Messing et al. | 15/DIG. 2 |
| 4,587,688 | 5/1986 | Gougoulas | 15/405 X |
| 4,689,749 | 8/1987 | Glogowski | 15/53 AB X |
| 4,794,938 | 1/1989 | Petit | 134/123 X |
| 4,817,301 | 4/1989 | Belanger et al. | 34/243 C |

*Primary Examiner*—Chris K. Moore
*Attorney, Agent, or Firm*—Ratner & Prestia

[57] ABSTRACT

Drying apparatus for an automatic car wash having separate sensing means for detecting the proximity of a nozzle to opaque top portions of vehicles and transparent top portions of vehicles to maintain the nozzle within a preselected proximity range of the top portions of the vehicles. Another sensing means is provided to detect the tailgates of open-bed pick-up trucks to retract the nozzle before it hits a tailgate. Also, the means by which the nozzle is mounted and moved toward and away from the vehicles vary the orientation of the nozzle relative to vertical as the nozzles moves between its uppermost and lowermost positions. Similar mounting and moving means can be used with side drying apparatus. In a second and more preferred form, ultrasonic detectors detect both the opaque parts of a vehicle and the windshield.

28 Claims, 4 Drawing Sheets

DRYER FOR AUTOMATIC CAR WASH EQUIPMENT

RELATED APPLICATION

This application is a continuation-in-part of U.S. Pat. No. 4,809,392, issued Mar. 7, 1989.

FIELD OF THE INVENTION

This invention relates to automatic car wash equipment and, in particular, to a system for drying rinse water from a vehicle by forced air. More particularly, the invention relates to sensing the proximity of a vehicle and for adjusting the position of a forced air nozzle.

BACKGROUND OF THE INVENTION

It is known to strip rinse water from a vehicle in a car wash. See, for example, U.S. Pat. Nos. 2,448,834 and 4,161,801. In these two patents, the nozzle through which the forced air is delivered is in contact with the vehicle surface. While this method takes advantage of the fact that the air velocity and pressure are greatest in the immediate vicinity of the nozzle, the method is subject to high maintenance costs due to wear and tear on the nozzle.

In U.S. Pat. Nos. 4,587,688 and 4,622,714, the nozzle is maintained close to but not in contact with the vehicle surface. In U.S. Pat. No. 4,587,688, a sonar-type of proximity detector generates signals which are sent to a control system which adjusts the position of the nozzle and maintains it in relatively close proximity to the vehicle surface. Such a sonar-type of proximity detector system is, however, limited to angles of incidence up to about 15°, beyond which the reflected signal is not detected.

SUMMARY OF THE INVENTION

A principal object of the present invention is to provide an improved proximity detection system for a dryer system in an automatic car wash equipment.

The foregoing object is accomplished by providing a proximity detection system which, in one preferred form, employs both optic-electronic and also sonar-type signals. The sonar signals are used to detect the location of the windshield. The optic-electronic signals are used to detect the opaque parts of the vehicle, i.e., the hood, roof, deck, side panels, etc. The effectiveness of the optic-electronic and sonar-type detection devices is enhanced by adjusting the angle of the detection devices for different portions of the vehicle.

An additional detector is provided to sense the tailgate of an open-bed pick-up truck or similar vehicle to retract the nozzle before it would hit the inside of the tailgate.

In a second and more preferred form, the present invention employs ultrasonic detectors to detect both the opaque parts of a vehicle and the windshield.

DETAILED DESCRIPTION OF THE PREFERRED EMBODIMENT

Figure 1:
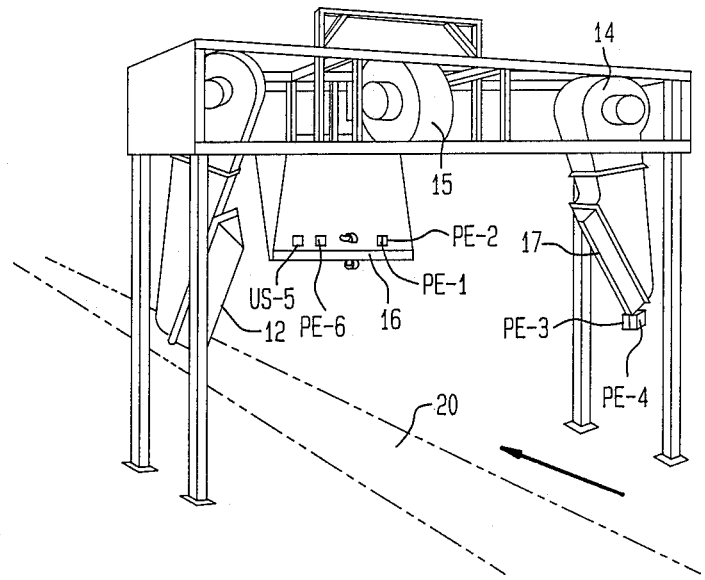
FIG. 1 is a diagrammatic illustration of an automatic car wash apparatus embodying the present invention.

FIG. 1 illustrates diagrammatically a car wash frame through which a car to be dried travels in the direction indicated by the arrow. Supported on the frame, at a location immediately following the car rinse operation, are three dryers: a top dryer, a driver's side dryer and a passenger side dryer. Each of the dryer systems includes a blower having a slot nozzle through which air is forced at high velocity. The blowers are so mounted as to be movable, as by a pneumatic or hydraulic cylinder, within a limited range to accommodate vehicles of different widths and heights.

Movement of the top and side blowers is controlled by a system which includes photoelectric sensor switches, control relays, timers, solenoid valves, flow control valves, hydraulic cylinders, and the like. Movement of the top blower is additionally controlled by an ultrasound detector positioned to receive sound wave reflections from the windshield or other top transparent portions (i.e. glass sunroof) of the car. The photoelectric and ultrasound sensors are effective to achieve vehicle contour tracing without any touching of the car surface. The links by which the dryers are mounted and moved maintain the proper angle of attack between the nozzle and the oncoming vehicle.

The car or other vehicle is guided along a guide rail 20 located on the driver's or left side of the vehicle. This maintains the vehicle at a desired distance from the blower nozzle so that no proximity control system for the driver side blower may be needed. If a proximity control system is needed for the driver side, such system may be essentially the same as the proximity control system for the passenger side blower system, which will be described in detail. Adjustment of the blower nozzle on the passenger side of the vehicle is accomplished by means which include two conventional triple-beam, range-measurement photoelectric sensor switches PE-3 and PE-4. Adjustment of the top blower nozzle is accomplished by means which include two triple-beam, range-measurement photoelectric sensor switches PE-1 and PE-2 and, in addition, an ultrasonic sensor US-5. A general description of how the photoelectric sensor switches operate will first be given.

As shown in FIG. 1, photoelectric switches PE-1 and PE-2 of the top blower system are mounted on the blower nozzle 16 and its beams are directed toward the approaching vehicle. Each of the photoelectric switches PE-1 and PE-2 emits a triple beam of pulsated light which is adjustable so that the three beams converge at a predetermined distance or range from the face of the unit. In the present case, assume that switch PE-1 is adjusted so that its three beams converge at a distance of 14 inches (approximately) from the face of PE-1, and that PE-2 is so adjusted that its beams converge at a distance of 12 inches (approximately) from the face of the unit. The PE units are of the reflective type. Once the range is set, any opaque surface, such as the metal surface of a car or its vinyl roof coming between the range setting and the face of the PE unit, will interrupt or break the beams of light and will reflect light to the receiving section of the PE unit. The PE units may be set for "DARK-ON" or "LIGHT-ON" operation. In the present case, it will be assumed that the units are set for "DARK-ON" operation. That is to say, the internal circuit of the PE unit is set so that its output transistor is ON when no light is being reflected to the unit. Thus, when a car surface reflects light, the internal circuit of the PE unit will turn OFF its output transistor.

When a car surface approaches the two units PE-1 and PE-2, and the triple beams from both PE-1 and PE-2 are broken, the top nozzle 16, on which the units PE-1 and PE-2 are mounted, starts to raise until the distance between the vehicle surface and the faces of PE-1 and PE-2 exceeds 12 inches. When this happens, the PE-2 beams are no longer broken. Nozzle 16 is then held from moving downward until the PE-1 beams are no longer broken. It should be pointed out that photoelectric units PE-1 and PE-2 are mounted on top nozzle 16 at a fixed distance rearwardly (upwardly) from the orifice. Assume this distance to be about 6 inches. Thus, when it is said that the nozzle 16 is moved by the proximity detection system to maintain the distance between the face of the photoelectric units PE-1, PE-2 and the car surface within a range of 12-14 inches, the nozzle is actually being maintained within the two-inch range of 6-8 inches (12-14 minus 6) from the surface of the vehicle.

Also shown in FIG. 1 is tailgate sensor PE-6. When an open-bed pick-up truck or similar vehicle is being dried, nozzle 16 can hit the inside surface of the tailgate because none of the sensors PE-1, PE-2 or US-5 is arranged to detect such a vertical surface. The problem is compounded by the tendency of certain drivers to pull-out of a car wash quickly as they pass the dryers leaving inadequate time for the top nozzle to retract from the open bed.

Sensor PE-6 is a photoelectric sensor which is disposed with a substantially horizontal orientation and, therefore, can detect vertical surfaces. When an open-bed pick-up truck is being dried, nozzle 16 will drop into the open bed. Sensor PE-6 will detect the tailgate and cause nozzle 16 to be retracted to a height which clears the tailgate before the nozzle hits the tailgate.

Figure 2:
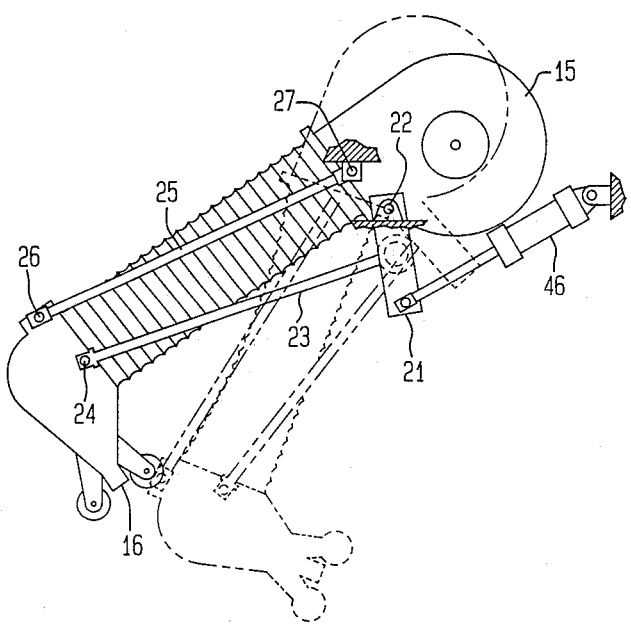
FIG. 2 is a side view of a top dryer system constructed in accordance with the present invention in extended and retracted positions.

In FIG. 2, top blower 15 and nozzle 16 are shown in solid lines for the uppermost position of the nozzle and by phantom lines for the lower most position of the nozzle. Actuation of cylinder 46 causes nozzle 16 to move. As the rod of cylinder 46 extends, member 21, mounted for pivotal movement about pivot 22 and connected to nozzle 16 through arm 23, moves nozzle 16 upward. Arm 23 is connected to nozzle 16 for pivotal movement about pivot 24. Arm 23 is fixed rigidly to member 21. A second arm 25 is connected to nozzle 16 for pivotal movement about pivot 26 with the opposite end of arm 25 mounted for pivotal movement about pivot 27.

The distance between pivot 24 and pivot 26 is greater than the distance between pivot 22 and pivot 27. The length of arm 25 is equal to the linear distance between pivot 22 and pivot 24. This relationship of the pivots results in the orientation of the nozzle changing as the nozzle moves between its uppermost and lowermost positions. As an example, the arrangement shown in FIG. 2 can vary the nozzle orientation from between 15° to 20° from the vertical with the nozzle in its lowermost position and 5° to 7½° from the vertical with the nozzle in its uppermost position. In this way, the nozzle orientation is adjusted for different top portions of the vehicle being dried. When the nozzle is over the hood, it is lower than when it is over the roof. Generally, the hood is sloped slightly upward toward the front windshield, while the roof is horizontal. With the orientation of the nozzle changing as it moves between its lowermost and uppermost positions, the air leaving the nozzle hits the hood and the roof portions of the vehicle at generally the same angle. In addition, this enhances the detection of the vehicle surfaces by operating the sensors near the centers of their angular ranges.

It will be noted that the range over which the nozzle orientation changes is relatively small and corresponds generally to the typical slope of the hood. The arrangement shown in FIG. 2 is effective in producing the relatively small changes in nozzle orientation for movement of the nozzle between its uppermost and lowermost positions.

The action of the photoelectric sensor switches PE-3 and PE-4 associated with the passenger side of the vehicle is similar to that described above for the top portion sensors. Of course, instead of raising the side nozzle, when the triple beams of PE-3 and PE-4 are both broken, the side proximity detector system causes side nozzle 17 to retract. In the case of the top dryer system, the nozzle 16 is lowered to the lowermost position by gravitational force. In the case of the side dryer system 14, the nozzle 17 is extended toward the car path by the application of pneumatic force. A linkage system, similar to the one shown in FIG. 2, can be used to support and move nozzle 17.

The side photoelectric switch units PE-3 and PE-4 may be assumed to be set to converge at 18 inches and 22 inches, respectively, thus establishing a 4-inch range within which the side nozzle is maintained. Assuming that the photoelectric units PE-3 and PE-4 are mounted on side nozzle about 6 inches from the orifice, the passenger side proximity detector system 14 maintains the nozzle 17 within a 4-inch range of 12-16 inches (18-22 minus 6) from the passenger side surface.

Referring again to the top dryer system 15, as already indicated, the top system includes an ultrasound detector unit, US-5; such as Sherman Industries, Inc. Sonar Sensor 5750-060. Such a unit is necessary because photoelectric units, such as PE-1 and PE-2, have difficulty in detecting and responding to light permeable surfaces, such as the glass windshield. For this reason, the top dryer system includes ultrasonic unit US-5 which is positioned to detect and respond to the windshield of the vehicle. The unit US-5 is mounted on the top nozzle 16 and may be set to have a range of 10 inches. When a reflected ultrasound signal is detected, the top nozzle 16 is raised. In most automobiles, the windshield is positioned at an angle of between 22° and 27° from the vertical. Hence, unit US-5 may be set at an angle about mid-way between 22° and 27°. With respect to other glass surfaces of the automobile which are substantially perpendicular to the ground (or in some cases parallel to the ground), the ultrasonic unit US-5 produces no signal from such surfaces since the US-5 unit only responds to reflections when the angle of incidence is less than about 15°. When the ultrasonic unit US-5 detects the windshield, it is effective to lift the nozzle 16 irrespective of the state of PE-1 and PE-2. In other words, US-5 is designed to override PE-1 and PE-2. Similarly, tailgate sensor PE-6 is effective to override PE-1 and PE-2. When photoelectric sensor PE-6 detects a tailgate, it will cause nozzle 16 to be raised irrespective of the state of sensor PE-1 or sensor PE-2.

On the basis of the description given thus far, the photoelectric systems would control the positions of nozzles 16 and 17 by subjecting the nozzles to oscillatory movement. To avoid such oscillations, time delays are introduced into the system. For example, a time delay of two seconds is introduced by a timer relay to maintain top nozzle 16 for that period of time in its raised, lowered or holding state and, in the case of side nozzle 17, to maintain side nozzle 17 for two seconds in its retracted, extended or holding state.

Figure 3:
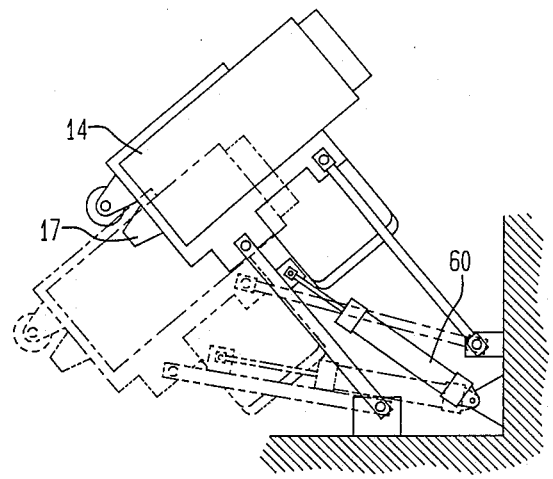
FIG. 3 is a top view of a side dryer system constructed in accordance with the present invention in extended and retracted positions.
Figure 4:
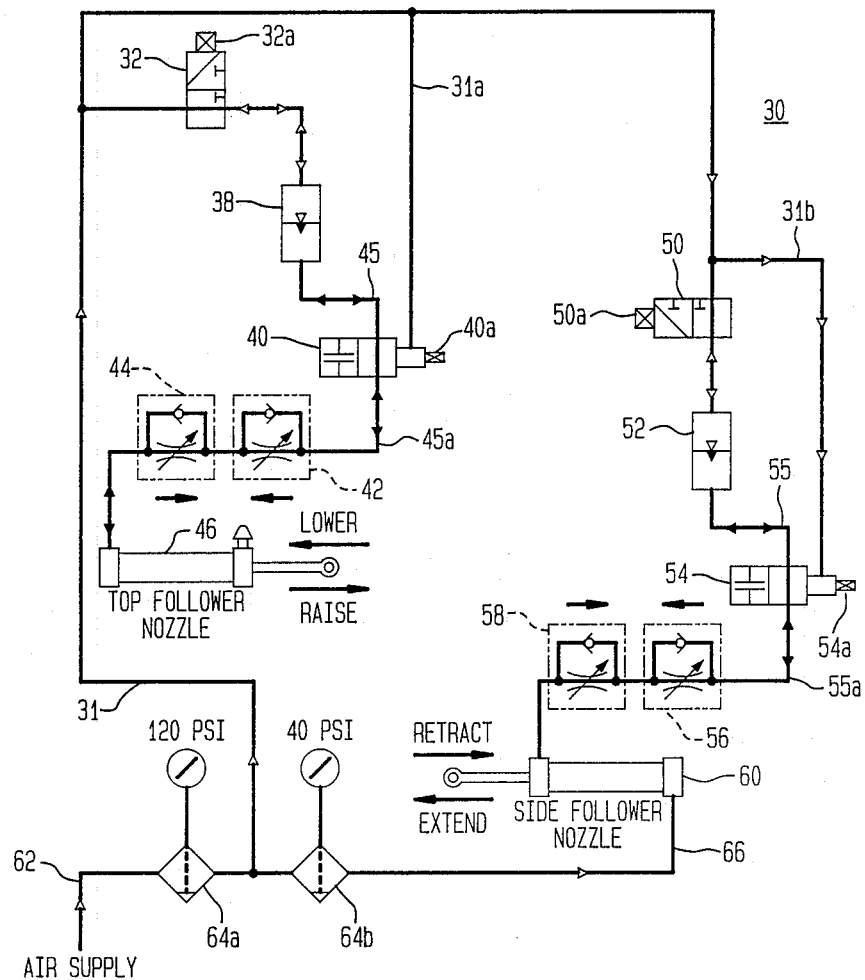
FIG. 4 is a schematic circuit diagram of the air/oil control system.

Movement of nozzles 16 and 17 is accomplished by piston cylinders 46 and 60, respectively (FIGS. 2, 3 and 4). These cylinders are actuated and controlled by an pneumatic/hydraulic control system 30 shown schematically in FIG. 4 and now to be described.

In system 30, a compressed air source 62 supplies air (about 80–100 p.s.i.) by way of air line 31 through a normally-open solenoid valve 32 to an air/oil reservoir 38. Reservoir 38 is effective, in response to air pressure from line 31, to provide hydraulic pressure to line 45 which is connected to an oil solenoid valve 40. Solenoid valve 40 is controlled by electrical signals supplied to its coil 40a. The position of the spool in valve 40 is controlled by air pressure in line 31a. When no electrical current is supplied to coil 40a, valve 40 is normally open and hydraulic pressure is applied through valve 40, oil line 45a flow-control valves 42, 44 to the left side of the piston of hydraulic cylinder 46. This is the condition illustrated in FIG. 4. This pressure maintains the piston of cylinder 46 fully extended and maintains top nozzle 16 in its uppermost, fully raised position. This is the fail-safe position. In other words, in the event of loss of electrical power, nozzle 16 is maintained in its raised position.

Nozzle 16 is also moved to its raised position in response to the triple beams of both PE-1 and PE-2 being broken by a car surface and light being reflected to the PE units. This is the LIGHT-ON condition of the units. In this condition, the output transistor is OFF and no current flows through solenoid coils 32a, 40a.

When the system is operating and light is not being reflected to both PE-1 and PE-2, coils 40a and 32a are energized and air pressure is exhausted through solenoid valve 32. This allows the oil pressure at unit 38 and at oil solenoid valve 40 to drop and allows oil to flow through flow control valves 44, 42. This allows the piston of cylinder 46 to move from right to left in response to gravitational force on nozzle 16. Thus, nozzle 16 moves down to its lowermost position awaiting arrival of a car.

When a car surface comes within 12 inches of the units PE-1 and PE-2, the triple beams of both units are broken, light is reflected to both units, and both units turn OFF. This deenergizes coil 40a of valve 40 and coil 32a of valve 32. This puts both of the valves 40 and 32 in the conditions illustrated in FIG. 4. Air pressure from line 31 is applied to air/oil reservoir 38 and oil pressure is applied through oil lines 45, 45a and flow control valves 42, 40 to the left end of hydraulic cylinder 46, causing its piston to extend and causing the nozzle 16 to be raised. This action continues until the distance between the car surface and the units PE-1 and PE-2 are no longer broken. Nozzle 16 is then held.

The air/oil control system for the passenger side nozzle 17 is also shown in FIG. 4 and operates in a generally similar manner to that just described, except that gravity plays no role in its operation. Air pressure in line 31 is applied through the normally-open solenoid valve 50 into air-oil reservoir 52. In response to such air pressure, hydraulic pressure is applied through normally-open solenoid valve 54, oil line 55a, and flow-control valves 56, 58 into the left side of the piston in hydraulic/pneumatic cylinder 60. This causes the piston of cylinder 60 to retract and puts side nozzle 17 at its most outward position. This is the fail-safe condition in that, in the event of loss of electrical power, with coils 50a and 54a deenergized, the solenoids 50 and 54 are in the conditions illustrated in FIG. 4 and the nozzle 17 is in its retracted position.

Since nozzle 17 on the passenger side of the car is not affected by gravity, in order to extend nozzle 17 it is necessary to apply air pressure to the right side of the piston of hydraulic/pneumatic cylinder 60, and this is done by way of air line 66, which carries air at less pressure than air line 31. However, air valve 50 and oil valve 54 are both normally open and hydraulic pressure is normally applied to the left side of the piston of cylinder 60. This is effective to retract the piston against the reduced air pressure applied through line 66 by way of pressure-reducing valve 64b. Forty (40) pounds of air pressure (p.s.i.) may, for example, be applied through line 66 to the right side of the piston of cylinder 60.

With nozzle 17 retracted, when the system is turned on, with no light being reflected to PE units PE-3 and PE-4, coils 50a and 54a are energized. This causes air solenoid valve 50 to move to the vent position and causes hydraulic valve 54 to move to the closed position. This reduces the pressure in oil lines 55 and 55a and allows the 40 lbs. of air pressure, which is being applied to the right side of the cylinder, to move the piston from right to left, thereby extending the piston and moving nozzle 17 toward the car path. When an opaque car surface comes within 18 inches of the faces of units PE-3, PE-4, the triple beams of both photoelectric switches are broken, light is reflected to both units, the units turn OFF, coils 50a and 54a are deenergized and the solenoid valves 50 and 54 return to the position illustrated in FIG. 4.

Figure 5:
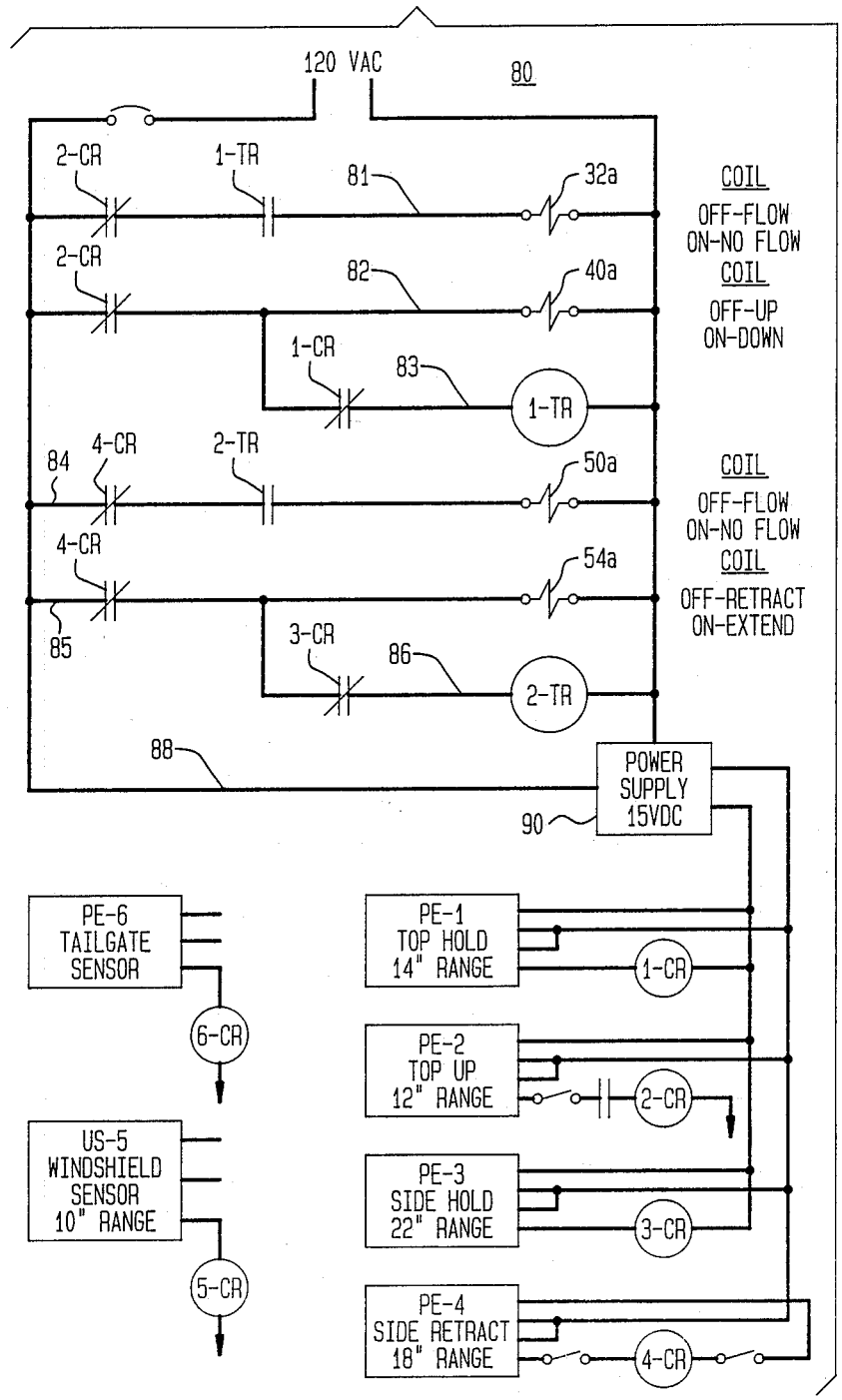
FIG. 5 is a schematic circuit diagram of the electrical control system.

The opto-electronic portion of the control system will now be described. A schematic of the optoelectric circuitry is shown in FIG. 5 to which reference will now be made. As already indicated, the photoelectric sensor switches PE-1, PE-2, PE-3 and PE-4 are ON when their respective beams are not interrupted and are OFF when their beams are broken and light is reflected to the units. As also described, each PE unit emits a triple-beam of light which is focused at a selected distance from the face of the PE unit. In the present case, it has been assumed that switch PE-1 which functions as the TOP HOLD sensor switch is focused at 14 inches, that switch PE-2 which functions as the TOP RAISE sensor switch is focused at 12 inches, that switch PE-3 which functions as the SIDE HOLD sensor is focused at 22 inches, and that switch PE-4 which functions as the SIDE RETRACT sensor switch is focused at 18 inches. It has also been assumed that each of the PE units is mounted on the nozzle structure 6 inches away from the orifice of the nozzle. Thus, the nozzles of the top and passenger side blowers are 6 inches closer to the automobile surface than are the focal dimensions given above.

As seen in FIG. 5, when the triple beams of PE-1 alone are broken by a car surface, the coil of relay 1-CR is deenergized and its contacts in branch 83, which had been closed, now open. Nothing happens, however, since the contacts of relay 2-CR in branches 81, 82 are still closed. When the triple beams of PE-2 are also broken, the coil of relay 2-CR is deenergized and its contacts in branches 81, 82 now open. This deenergizes winding 40a of solenoid valve 40 (FIG. 4) and moves the valve to the open position illustrated in FIG. 4. Oil pressure is now applied to the left end of cylinder 46 and nozzle 16 is raised toward the UP position. As soon as the distance between the car surface and the face of PE-2 exceeds 12 inches, the beams of PE-2 are no longer reflected to the PE-2 cell and PE-2 turns ON. This energizes the coil of relay 2-CR and its contacts in branches 81, 82 close. This energizes coil 40a and moves solenoid valve 40 to the closed or blocking position, thereby holding nozzle 16. If the distance between the face of the PE units and the car surface should exceed 14 inches, the triple beam of PE-1 will also not be broken, no light will be reflected to PE-1 and PE-1 will turn ON. Relay coil 1-CR will now be energized and its contacts 1-CR in branch 83 will close. This energizes the coil of timer relay 1-TR and, after a delay of two seconds, the 1-TR contacts in branch 81 will open. This deenergizes the coil 32a of solenoid valve 32 and moves valve 32 to the closed position. However, during the two-second delay, the valve 32 was in exhaust condition. This allowed the oil pressure in lines 45a and 45 to be reduced and allowed the piston in cylinder 46 to move in a direction to lower nozzle 16.

The action of the proximity detector and control system for the top dryer system may be summarized as follows. As the distance from the photoelectric switch units PE-1 and PE-2 to the car surface decreases, either because the car is approaching the units and/or because the top nozzle 16 on which the PE-1 and PE-2 units are mounted is dropping downwardly, when the distance becomes less than 14 inches, the triple beams of PE-1 are broken. When the distance becomes less than 12 inches, the triple beams of PE-2 are also broken. When the beams of both PE-1 and PE-2 are broken, the control system raises nozzle 16 until the distance exceeds 12 inches. The nozzle 16 is then HELD, but only so long as the distance does not exceed 14 inches. If the distance exceeds 14 inches, nozzle 16 is allowed to drop downwardly by gravity until the distance is between 12" and 14", at which time the nozzle is held at this distance. Timer delay relays are used to avoid or reduce oscillatory movement. Top nozzle 16 is maintained by the photoelectric and air/oil circuitry of FIGS. 4 and 5 within a 12–14 inch range. As previously indicated, this is the distance from the reflecting surface of the car to the face of the PE-1 and PE-2 photoelectric switches. However, since these cells are mounted on the blower-nozzle structure approximately 6 inches above the orifice of the nozzle 16. Thus, the range in which nozzle 16 is maintained is actually 6–8 inches from the car.

The side photoelectric switch units PE-3 and PE-4 function in a generally similar manner to that just described. As indicated previously, the side system differs from the top system in that gravity plays no part. Retraction of the piston of hydraulic cylinder 60 is effected by air pressure applied through line 66 to the right side of the piston.

For the convenience of the reader, Table 1 and 2 are presented below. Table 1 relates to the top nozzle 16. Table 2 relates to the passenger side nozzle 17. These two Tables present in summary form the action or condition of the top and side nozzles 16, 17 under the various conditions of the beams of PE-1, PE-2, PE-3 and PE-4, i.e., beams broken or unbroken by the surface of the car.

TABLE 1

| PE-1 | PE-2 | Top Nozzle 16 |
| --- | --- | --- |
| Broken | Broken | Raise |
| Broken | Unbroken | Hold |
| Unbroken | Unbroken | Lower |

TABLE 2

| PE-3 | PE-4 | Side Nozzle 17 |
| --- | --- | --- |
| Broken | Broken | Retract |
| Broken | Unbroken | Hold |
| Unbroken | Unbroken | Extend |

The Tables given above do not include the ultrasound detector US-5 which is mounted on the top nozzle 16. This detector causes the top nozzle 16 to raise when sound is reflected to the detector from a windshield which has come within 10 inches of the detector. As seen in FIG. 5, when US-5 is actuated by a reflected ultrasound signal, the coil of relay 5-CR is energized and its normally-closed contacts 5-CR now open. This deenergizes the coil of relay 2-CR and its contacts 2-CR in branch 82 open. This deenergizes winding 40a of solenoid valve 40 and puts valve 40 in the condition shown in FIG. 4. Oil pressure is applied to the left end of cylinder 46 and nozzle 16 is raised.

The Tables given above also do not include photoelectric sensor PE-6. This sensor controls movement of nozzle 16 in much the same way as ultrasound sensor US-5. Sensor PE-6 differs from sensors PE-1, PE-2, PE-3 and PE-4 because sensor PE-6 is OFF when its beam is uninterrupted and ON when its beam is broken. When an object is in close proximity to sensor PE-6 and interrupts its beam, the coil of relay 6-CR is energized and its normally closed contacts now open. This deenergizes the coil of relay 2-CR and its contacts in branch 82 open. This deenergizes the coil of relay 2-CR and its contacts in branch 82 open. This deenergizes winding 40a of solenoid valve 40 and puts solenoid valve 40 in the condition shown in FIG. 4. Oil pressure is applied to the left end of cylinder 46 and nozzle 16 is raised.

The triple beam photoelectric sensor switches which have been identified in this application as units PE-1, PE-2, PE-3, PE-4 and PE-6 may preferably be photoelectric switches (area reflection type) such as Sherman Industries, Inc. Triple Beam Photosensors 5750-030. The units may be connected to operate when light enters (LIGHT-ON) or may be connected to operate when light is blocked (DARK-ON). In the system which has been described above, the PE-1, PE-2, PE-3 and PE-4 switches are assumed to be connected to operate when light is blocked (DARK-ON), and the PE-6 switch is assumed to be connected to operate when the beam is uninterrupted (LIGHT-ON).

Figure 6:
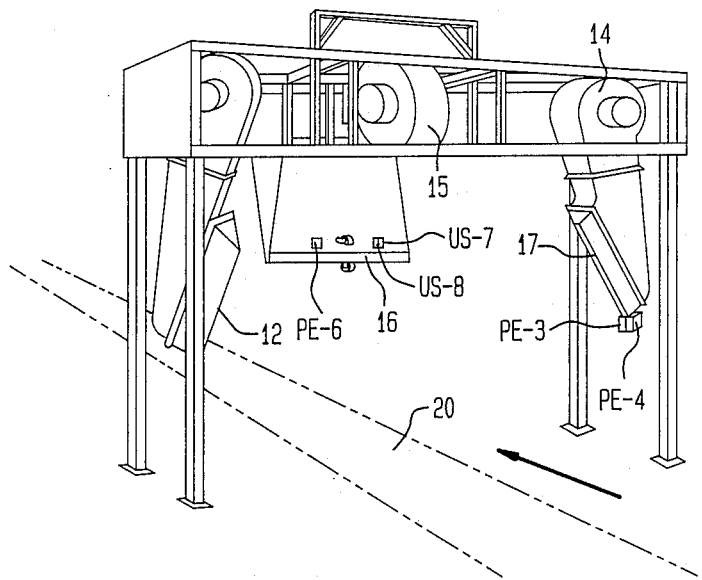
FIG. 6 is a diagrammatic illustration of a second and preferred automatic car wash apparatus embodying the present invention.

In the FIG. 6 embodiment of the invention, adjustment of the top blower nozzle is accomplished by means which include two range-measurement ultrasonic sensor switches US-7 and US-8. Each of these ultrasonic sensors may be, for example, a product of Migatron Corp., Part No. RPS-100-72, having an angular range of approximately 35° to each side of the perpendicular to a surface being detected. As will be understood from the following explanation, such ultrasonic sensors can function to detect both opaque and transparent surfaces with the result that two such sensors can replace sensors PE-1, PE-2 and US-5 making the embodiment of FIG. 6 preferred.

As shown in FIG. 6, ultrasonic switches US-7 and US-8 of the top blower system are mounted on the blower nozzle 16 and they are directed toward the approaching vehicle. Each of the ultrasonic switches US-7 and US-8: (1) transmits ultrasonic pulses toward a target, (2) receives reflections from the target, and (3) develops outputs which control the movement and positioning of the top blower system determined by the time required for the ultrasonic pulses to make the round-trip from the sensors to the target and back to the sensors. Each of the ultrasonic sensors is set for a different round-trip time, so that the outputs of the sensors locate the surface to be detected relative to the sensors. In the present case, assume that switch US-7 is adjusted so that it signals when a vehicle is within a distance of 14 inches (approximately) from the face of US-7, and that US-8 is adjusted so that it signals when a vehicle is within a distance of 12 inches (approximately) from the face of US-8. Once the range is set, any surface, such as the metal surface of a car or its vinyl roof or glass windshields or sunroofs, coming between the range setting and the face of the ultrasonic unit, will cause the sensor to generate an appropriate output.

When a car surface approaches the two units US-7 and US-8, and comes within 12 inches from both US-7 and US-8, the top nozzle 16, on which the units US-7 and US-8 are mounted, starts to raise until the distance between the vehicle surface and the faces of US-7 and US-8 exceeds 12 inches. When this happens, the output of sensor US-8 changes. Nozzle 16 is then held from moving downward until the output from sensor US-7 changes. It should be pointed out that ultrasonic units US-7 and US-8 are mounted on top nozzle 16 at a fixed distance rearwardly (upwardly) from the orifice. Assume this distance to be about 6 inches. Thus, when it is said that the nozzle 16 is moved by the proximity detection system to maintain the distance between the face of the ultrasonic units US-7, US-8 and the car surface within a range of 12-14 inches, the nozzle is actually being maintained within the two-inch range of 6-8 inches (12-14 minus 6) from the surface of the vehicle.

Nozzle 16 is moved to its raised position in response to the outputs of both US-7 and US-8 when a car surface comes within range. When this occurs, the outputs of the sensors are OFF and no current flows through solenoid coils 32a, 40a.

When the system is operating and a vehicle is not within range, so that neither ultrasonic sensor detects a vehicle surface, coils 40a and 32a are energized and air pressure is exhausted through solenoid valve 32. This allows the oil pressure at unit 38 and at oil solenoid valve 40 to drop and allows oil to flow through flow control valves 44, 42. This allows the piston of cylinder 46 to move from right to left in response to gravitational force on nozzle 16. Thus, nozzle 16 moves down to its lowermost position awaiting arrival of a car.

When a car surface comes within 12 inches of the units US-7 and US-8, both units turn OFF. This deenergizes coil 40a of valve 40 and coil 32a of valve 32. This puts both of the valves 40 and 32 in the conditions illustrated in FIG. 4. Air pressure from line 31 is applied through oil lines 45, 45a and flow control valves 42, 40 to the left end of hydraulic cylinder 46, causing its piston to extend and causing the nozzle 16 to be raised. This action continues until the distance between the car surface and the sensors US-7 and US-8 exceeds the specified distance namely, 14 inches. Nozzle 16 is then held.

The electrical control system of FIG. 7 will now be described. As already indicated, the ultrasonic sensor switches US-7 and US-8 and the photoelectric sensor switches PE-3 and PE-4 are ON when a vehicle is out of range and are OFF when a vehicle is within range. In the present case, it has been assumed that sensor switch US-7 which functions as the TOP HOLD sensor switch is set at 14 inches, that switch US-8 which functions as the TOP RAISE sensor switch is set at 12 inches, that switch PE-3 which functions as the SIDE HOLD sensor is focused at 22 inches, and that switch PE-4 which functions as the SIDE RETRACT sensor switch is focused at 18 inches. It has also been assumed that each of the sensor units is mounted on the nozzle structure 6 inches away from the orifice of the nozzle. Thus, the nozzles of the top and passenger side blowers are 6 inches closer to the automobile surface than are the dimensions given above.

Figure 7:
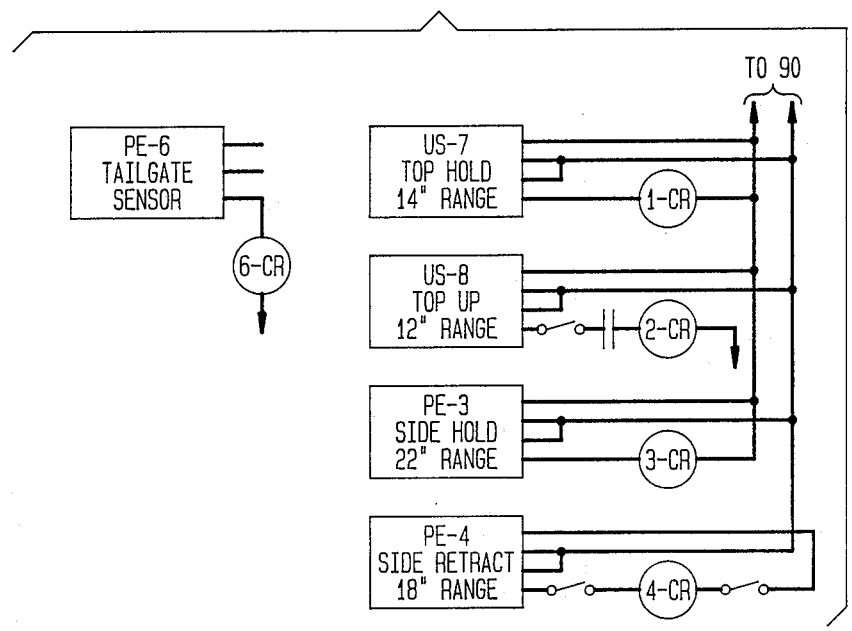
FIG. 7 is a schematic circuit diagram of the electrical control system for the FIG. 6 embodiment of the present invention.

As seen in FIGS. 5 and 7, when the ultrasonic sensor US-7 alone is OFF, the coil of relay 1-CR is deenergized and its contacts in branch 83, which had been closed, now open. Nothing happens, however, since the contacts of relay 2-CR in branches 81, 82 are still closed. When ultrasonic sensor US-8 also is OFF, the coil of relay 2-CR is deenergized and its contacts in branches 81, 82 now open. This deenergizes winding 32a of solenoid valve 32 (FIG. 4) and moves the valve to the open position illustrated in FIG. 4 and deenergizes winding 40a of solenoid valve 40 (FIG. 4) and moves the valve to the open position illustrated in FIG. 4. Oil pressure is now applied to the left end of cylinder 46 and nozzle 16 is raised toward the UP position. As soon as the distance between the car surface and the face of US-8 exceeds 12 inches, US-8 turns ON. This energizes the coil of relay 2-CR and its contacts in branches 81, 82 close. This energizes coil 40a and moves solenoid valve 40 to the closed or blocking position, thereby holding nozzle 16. If the distance between the face of the ultrasonic sensor units and the car surface should exceed 14 inches, ultrasonic sensor US-7 will turn ON. Relay coil 1-CR will now be energized and its contacts 1-CR in branch 83 will close. This energizes the coil of timer relay 1-TR and, after a delay of two seconds, the 1-TR contacts in branch 81 will open. This deenergizes the coil 32a of solenoid valve 32 and moves valve 32 to the closed position. However, during the two-second delay, the valve 32 was in exhaust condition. This allowed the oil pressure in lines 45a and 45 to be reduced and allowed the piston in cylinder 46 to move in a direction to lower nozzle 16.

The action of the proximity detector and control system for the second and preferred embodiment may be summarized as follows. As the distance from the ultrasonic sensors to the car surface decreases, either because the car is approaching the units and/or because the top nozzle 16 on which the ultrasonic sensors are mounted is dropping downwardly, when the distance becomes less than 14 inches, the ultrasonic sensor US-7 is turned OFF. When the distance becomes less than 12 inches, ultrasonic sensor US-8 is turned OFF also. When both ultrasonic sensor US-7 and ultrasonic sensor US-8 are turned OFF, the control system raises nozzle 16 until the distance exceeds 12 inches. The nozzle 16 is then HELD, but only so long as the distance does not exceed 14 inches. If the distance exceeds 14 inches, nozzle 16 is allowed to drop downwardly by gravity until the distance is between 12" and 14", at which time the nozzle is held at this distance. Timer delay relays are used to avoid or reduce oscillatory movement. Top nozzle 16 is maintained by the electrical and air/oil circuitry of FIGS. 4, 5 and 7 within a 12–14 inch range. As previously indicated, this is the distance from the reflecting surface of the car to the face of the US-7 and US-8 ultrasonic switches. However, these cells are mounted on the blower-nozzle structure approximately 6 inches above the orifice of the nozzle 16. Thus, the range in which nozzle 16 is maintained is actually 6–8 inches from the car.

For the convenience of the reader, Table 3 is presented below. Table 3 relates to the top nozzle 16. This Table presents in summary form the action or condition of the top nozzle 16 under the various conditions of the ultrasonic sensors US-7 and US-8.

TABLE 3

| US-7 | US-8 | Top Nozzle 16 |
| --- | --- | --- |
| OFF | OFF | Raise |
| OFF | ON | Hold |
| ON | ON | Lower |

Table 3 given above does not include photoelectric sensor PE-6. This sensor controls movement of nozzle 16 in the same way for the second embodiment as for the first embodiment.

We claim:

1. Automatic car wash equipment comprising:
 a forced-air dryer including a blower for producing high-velocity air and a nozzle for directing said high-velocity air toward vehicles being washed;
 support means for mounting said forced-air dryer above a path followed by said vehicles to direct said high-velocity air from said nozzle to top opaque portions and top transparent portions of said vehicles;
 drive means for moving said nozzle toward and away from said vehicles;
 first sensor means mounted on said nozzle for detecting the proximity of said nozzle to said top opaque portions of said vehicles and for developing first control signals representative of the proximity of said nozzle to said top opaque portions of said vehicles;
 second sensor means mounted on said nozzle for detecting the proximity of said nozzle to said top transparent portions of said vehicles and for developing second control signals representative of the proximity of said nozzle to said top transparent portions of said vehicles;
 and control means responsive to said first and said second control signals for controlling said drive means to maintain said nozzle within a preselected proximity range of said top opaque portions of said vehicles and said top transparent portions of said vehicles.

2. Automatic car wash equipment according to claim 1 wherein:
 (a) said first sensor means include a first photoelectric sensor focused at a first distance and a second photoelectric sensor focused at a second distance and said proximity range is defined by the difference between said first and said second distances; and
 (b) said second sensor means include an ultrasound sensor.

3. Automatic car wash equipment according to claim 2 further including third sensor means mounted on said nozzle for detecting the proximity of said nozzle to tailgates of open-bed pick-up trucks and for developing third control signals representative of the proximity of said nozzle to said tailgates.

4. Automatic car wash equipment according to claim 3 wherein said control means are responsive to said third control signals for controlling said drive means to move said nozzle to a height which clears said tailgates.

5. Automatic car wash equipment according to claim 4 wherein said third sensor means include a photoelectric sensor.

6. Automatic car wash equipment according to claim 5 wherein said photoelectric sensor of said third sensor means is disposed with a substantially horizontal orientation.

7. Automatic car wash equipment according to claim 1 wherein said support means include means for varying the orientation of said nozzle relative to the vertical as said nozzle moves between its uppermost and lowermost positions.

8. Automatic car wash equipment according to claim 7 wherein the orientation of said nozzle varies from between 15° to 20° from the vertical when said nozzle is in its lowermost position and 5° to 7½° from the vertical when said nozzle is in its uppermost position.

9. Automatic car wash equipment according to claim 2 wherein said support means include means for varying the orientation of said nozzle relative to the vertical as said nozzle moves between its uppermost and lowermost positions.

10. Automatic car wash equipment according to claim 3 wherein said support means include means for varying the orientation of said nozzle relative to the vertical as said nozzle moves between its uppermost and lowermost positions.

11. Automatic car wash equipment according to claim 4 wherein said support means include means for varying the orientation of said nozzle relative to the vertical as said nozzle moves between its uppermost and lowermost positions.

12. Automatic car wash equipment according to claim 5 wherein said support means include means for varying the orientation of said nozzle relative to the vertical as said nozzle moves between its uppermost and lowermost positions.

13. Automatic car wash equipment according to claim 6 wherein said support means include means for varying the orientation of said nozzle relative to the vertical as said nozzle moves between its uppermost and lowermost positions.

14. Automatic car wash equipment comprising:
 a forced-air dryer including a blower for producing high-velocity air and a nozzle for directing said high-velocity air toward vehicles being washed;
 support means for mounting said forced-air dryer along a path followed by said vehicles to direct said high-velocity air from said nozzle to portions of said vehicles, said support means including means for varying the orientation of said nozzle relative to the vertical as said nozzle is moved toward and away from said vehicles;

drive means for moving said nozzle toward and away from said vehicles;
sensor means mounted on said nozzle for detecting the proximity of said nozzle to said portions of said vehicles and for developing control signals representative of the proximity of said nozzle to said portions of said vehicles;
control means responsive to said control signals for controlling said drive means to maintain said nozzle within a preselected proximity range of said portions of said vehicles; and
said sensor means including a first photoelectric sensor focused at a first distance and a second photoelectric sensor focused at a second distance and said proximity range is defined by the difference between said first and said second distances.

15. Automatic car wash equipment comprising:
a forced-air dryer including a blower for producing high-velocity air and a nozzle for directing said high-velocity air toward vehicles being washed;
support means for mounting said forced-air dryer alongside a path followed by said vehicles to direct said high-velocity air from said nozzle to side portions of said vehicles, said support means including means for varying the orientation of said nozzle relative to the vertical as said nozzle is moved toward and away from said vehicles;
drive means for moving said nozzle toward and away from said vehicles;
sensor means mounted on said nozzle for detecting the proximity of said nozzle to said portions of said vehicles and for developing control signals representative of the proximity of said nozzle to said side portions of said vehicles, said sensor means including a first photoelectric sensor focused at a first distance and a second photoelectric sensor focused at a second distance and said proximity range is defined by the difference between said first and said second distance; and
control means responsive to said control signals for controlling said drive means to maintain said nozzle within a preselected proximity range of said side portions of said vehicles.

16. Automatic car wash equipment comprising:
a forced-air dryer including a blower for producing high-velocity air and a nozzle for directing said high-velocity air toward vehicles being washed;
support means for mounting said forced-air dryer above a path followed by said vehicles to direct said high-velocity air from said nozzle to top opaque portions and top transparent portions of said vehicles;
drive means for moving said nozzle toward and away from said vehicles;
first sensor means mounted on said nozzle for detecting the proximity of said nozzle to said top opaque portions of said vehicles and said top transparent portions of said vehicles and for developing first control signals representative of the proximity of said nozzle to said top opaque portions of said vehicles and said top transparent portions of said vehicles;
second sensor means mounted on said nozzle for detecting the proximity of said nozzle to tailgates of open-bed pick-up trucks and for developing second control signals representative of the proximity of said nozzle to said tailgates;
and control means responsive to said first and said second control signals for controlling said drive means: (1) to maintain said nozzle within a preselected proximity range of said top opaque portions of said vehicles and said top transparent portions of said vehicles and (2) to move said nozzle to a height which clears said tailgates.

17. Automatic car wash equipment according to claim 16 wherein said second sensor means include a photoelectric sensor.

18. Automatic car wash equipment according to claim 17 wherein said photoelectric sensor of said second sensor means is disposed with a substantially horizontal orientation.

19. Automatic car wash equipment according to claim 16 wherein said support means include means for varying the orientation of said nozzle relative to the vertical as said nozzle moves between its uppermost and lowermost positions.

20. Automatic car wash equipment according to claim 19 wherein the orientation of said nozzle varies from between 15° to 20° from the vertical when said nozzle is in its lowermost position and 5° to 7½° from the vertical when said nozzle is in its uppermost position.

21. Automatic car wash equipment according to claim 17 wherein said support means include means for varying the orientation of said nozzle relative to the vertical as said nozzle moves between its uppermost and lowermost positions.

22. Automatic car wash equipment according to claim 18 wherein said support means include means for varying the orientation of said nozzle relative to the vertical as said nozzle moves between its uppermost and lowermost positions.

23. Automatic car wash equipment according to claim 16 wherein said first sensor means include a first ultrasonic sensor set at a first range and a second ultrasonic sensor set at a second range and said proximity range is defined by the difference between said first and said second ranges.

24. Automatic car wash equipment according to claim 23 wherein said second sensor means include a photoelectric sensor.

25. Automatic car wash equipment according to claim 24 wherein said photoelectric sensor of said second sensor means is disposed with a substantially horizontal orientation.

26. Automatic car wash equipment according to claim 25 wherein said support means include means for varying the orientation of said nozzle relative to the vertical as said nozzle moves between its uppermost and lowermost positions.

27. Automatic car wash equipment according to claim 26 wherein the orientation of said nozzle varies from between 15° to 20° from the vertical when said nozzle is in its lowermost position and 5° to 7½° from the vertical when said nozzle is in its uppermost position.

28. Automatic car wash equipment comprising:
a forced-air dryer including a blower for producing high-velocity air and a nozzle for directing said high-velocity air toward vehicles being washed;
support means for mounting said forced-air dryer along a path followed by said vehicles to direct said high-velocity air from said nozzle to portions of said vehicles;
drive means for moving said nozzle toward and away from said vehicles;

sensor means mounted on said nozzle for detecting the proximity of said nozzle to said portions of said vehicles and for developing control signals representative of the proximity of said nozzle to said portions of said vehicles;

control means responsive to said control signals for controlling said drive means to maintain said nozzle within a preselected proximity range of said portions of said vehicles; and said support means including means for varying the orientation of said sensor means relative to the vertical as said nozzle is moved toward and away from said vehicles, said orientation of said sensor means varying between 15° to 20° from vertical when said nozzle is in its lowermost position and 5° to 7.5° from vertical when said nozzle is in its uppermost position.

* * * * *